United States Patent
Chou et al.

(10) Patent No.: US 11,482,892 B2
(45) Date of Patent: Oct. 25, 2022

(54) SYSTEMS AND METHODS FOR WIRELESS VEHICLE POWER TRANSFER TO VEHICLE DEVICES USING MISALIGNMENT SENSORS

(71) Applicant: Toyota Motor Engineering & Manufacturing North America, Inc., Plano, TX (US)

(72) Inventors: Chungchih Chou, Ann Arbor, MI (US); Yanghe Liu, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/167,825

(22) Filed: Feb. 4, 2021

(65) Prior Publication Data

US 2022/0181919 A1    Jun. 9, 2022

Related U.S. Application Data

(60) Provisional application No. 63/122,133, filed on Dec. 7, 2020.

(51) Int. Cl.
*H02J 50/90* (2016.01)
*H02J 50/40* (2016.01)
*H02J 50/80* (2016.01)

(52) U.S. Cl.
CPC ........... *H02J 50/90* (2016.02); *H02J 50/402* (2020.01); *H02J 50/80* (2016.02)

(58) Field of Classification Search
None
See application file for complete search history.

(56) References Cited

U.S. PATENT DOCUMENTS 8,030,888 B2    10/2011  Pandya et al.
8,823,551 B1 *   9/2014  Hoffman ............... B60L 53/126
                                              340/988

(Continued)

FOREIGN PATENT DOCUMENTS

WO    2017088803 A1    6/2017

OTHER PUBLICATIONS

Ciprian Antaloae, Nicholas Vaughan, and James Marco, Investigation of high frequency AC power distribution benefits for the automobile auxiliary electrical system, SAE Int. J. Passeng. Cars—Electron. Elect. Syst., vol. 3, pp. 109-121, Published Apr. 12, 2010, 13 pages.

(Continued)

*Primary Examiner* — Daniel Kessie
(74) *Attorney, Agent, or Firm* — Dinsmore & Shohl LLP

(57) ABSTRACT

A vehicle includes one or more low load devices and a plurality of magnetic sensors operable between a misalignment detection mode for measuring a magnetic field of a power transmitting pad and obtaining magnetic field data, and a power receiving mode for wirelessly transmitting energy from the power transmitting pad to the one or more low load devices. The vehicle also includes one or more processors and one or more memory modules including a computer-readable medium storing computer-readable instructions that, when executed by the one or more processors, cause the one or more processors to receive the magnetic field data from the plurality of magnetic sensors, and estimate a lateral misalignment of the plurality of magnetic sensors with respect to a magnetic axis of the power transmitting pad.

19 Claims, 6 Drawing Sheets

(56) References Cited

U.S. PATENT DOCUMENTS

| | | | |
|---|---|---|---|
| 8,890,472 B2 | 11/2014 | Mashinsky | |
| 9,126,490 B2 | 9/2015 | Cook et al. | |
| 9,431,169 B2 | 8/2016 | Huang et al. | |
| 9,739,641 B2* | 8/2017 | Raedy | G01D 5/20 |
| 2008/0100706 A1* | 5/2008 | Breed | G01S 7/539 |
| | | | 348/143 |
| 2009/0027662 A1* | 1/2009 | Rogers | G01B 11/2755 |
| | | | 356/139.09 |
| 2011/0316334 A1* | 12/2011 | Shimokawa | H02J 50/50 |
| | | | 307/104 |
| 2012/0169139 A1* | 7/2012 | Kudo | H02J 50/80 |
| | | | 307/104 |
| 2013/0293028 A1* | 11/2013 | Byun | H02J 50/60 |
| | | | 307/104 |
| 2015/0094887 A1* | 4/2015 | Kawashima | H02J 50/90 |
| | | | 320/108 |
| 2016/0059723 A1* | 3/2016 | Kim | B60L 53/39 |
| | | | 320/108 |
| 2016/0285312 A1* | 9/2016 | Maniktala | H02J 50/40 |
| 2016/0380488 A1* | 12/2016 | Widmer | B60L 53/36 |
| | | | 324/207.15 |
| 2017/0249838 A1* | 8/2017 | Breed | G08G 1/096716 |
| 2018/0019623 A1* | 1/2018 | Tsukamoto | B60L 53/66 |
| 2018/0345792 A1 | 12/2018 | Liu et al. | |
| 2019/0016228 A1* | 1/2019 | Hashimoto | B60L 53/37 |
| 2019/0111797 A1* | 4/2019 | Lee | B60L 53/38 |
| 2019/0315246 A1* | 10/2019 | Li | B60L 53/65 |
| 2020/0136438 A1* | 4/2020 | Seong | G01S 1/0426 |
| 2020/0136439 A1* | 4/2020 | Seong | G01R 33/02 |
| 2020/0198481 A1* | 6/2020 | Hein | B60L 53/122 |
| 2020/0290467 A1 | 9/2020 | Gao et al. | |
| 2021/0242716 A1* | 8/2021 | Lee | H02J 50/10 |

OTHER PUBLICATIONS

Review of static and dynamic wireless electric vehicle charging system (https://www.sciencedirect.com/science/article/pii/S221509861830154X), published Jun. 16, 2018, 3 pages.

Chirag Panchal, Sascha Stegen, and Junwei Lu, Inductive power transfer systems for electric vehicles (https://eps.fiu.edu/inductive-power-transfer-systems/), vol. 21, Issue 5, Oct. 2018, pp. 922-937, 44 pages.

\* cited by examiner

SYSTEMS AND METHODS FOR WIRELESS VEHICLE POWER TRANSFER TO VEHICLE DEVICES USING MISALIGNMENT SENSORS

CROSS-REFERENCE TO RELATED APPLICATION

This application claims priority to U.S. Provisional Patent Application No. 63/122,133, filed Dec. 7, 2020, for "Systems And Methods For Wireless Vehicle Power Transfer To Vehicle Devices Using Misalignment Sensors," which is hereby incorporated by reference in its entirety including the drawings.

TECHNICAL FIELD

The present specification generally relates to charging systems and methods for dynamic wireless charging of a vehicle and, more specifically, charging systems and methods for utilizing magnetic sensors that estimate lateral misalignment and provide power to vehicle devices.

BACKGROUND

Current inductive charging technology for vehicles eliminates the need for plugging a cable into the vehicle as power is wirelessly transferred between a power source and the vehicle. During wireless power transfer from the power source to the vehicle, misalignment between the vehicle and the power source can reduce the efficiency and the rate at which energy can be transmitted to the vehicle, specifically a power receiving pad of the vehicle. As a result, the time required to fully charge the battery of the vehicle is increased.

Sensors for detecting misalignment may be useful to determine how the misalignment may be minimized. However, these sensors are only configured detect misalignment, while the power receiving pad is utilized as to receive power from the power source and deliver power to the battery of the vehicle. Thus, when additional power is required to energize additional devices, such as those required during autonomous or semi-autonomous driving, the power must be received at the power receiving pad from the power source and subsequently distributed or transmitted to the additional devices. This puts additional strain on the power receiving pad.

SUMMARY

In one embodiment, a vehicle includes one or more low load devices, a plurality of magnetic sensors operable between a misalignment detection mode for measuring a magnetic field of a power transmitting pad and obtaining magnetic field data, and a power receiving mode for wirelessly transmitting energy from the power transmitting pad to the one or more low load devices, one or more processors, and one or more memory modules including a computer-readable medium storing computer-readable instructions that, when executed by the one or more processors, cause the one or more processors to receive the magnetic field data from the plurality of magnetic sensors, and estimate a lateral misalignment of the plurality of magnetic sensors with respect to a magnetic axis of the power transmitting pad.

In another embodiment, a vehicle includes one or more low load devices, a power receiving pad for wirelessly receiving energy from a power transmitting pad, a plurality of magnetic sensors operable between a misalignment detection mode for measuring a magnetic field of the power transmitting pad and obtaining magnetic field data, and a power receiving mode for wirelessly transmitting energy from the power transmitting pad to the one or more low load devices, one or more processors and one or more memory modules including a computer-readable medium storing computer-readable instructions that, when executed by the one or more processors, cause the one or more processors to receive the magnetic field data from the plurality of magnetic sensors, and estimate a lateral misalignment of the power receiving pad with respect to a magnetic axis of the power transmitting pad.

In yet another embodiment, a method for providing dynamic wireless power transfer to one or more low load devices of a vehicle includes operating a plurality of magnetic sensors in a misalignment detection mode, detecting, using the plurality of magnetic sensors, a magnetic field provided by a power transmitting pad to obtain magnetic field data, estimating a lateral misalignment of a power receiving pad with respect to a magnetic axis of the power transmitting pad using the magnetic field, and switching the plurality of magnetic sensors to operate in a power receiving mode to wirelessly transmit power to one or more low load devices from the power transmitting pad.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicles, systems, and methods for utilizing a plurality of magnetic sensors to estimate lateral misalignment between a power receiving system on a vehicle and a power transmitting system in a road, and wirelessly transmit power from the power transmitting system low load devices via the plurality of magnetic sensors. Thus, the magnetic sensors disclosed herein provide dual functions.

By utilizing the magnetic sensors to transmit power, additional power may be transmitted to various components of the vehicle, such as a plurality of low load devices, in addition to the power transmitted by a power receiving pad of the power receiving system. The low load devices may be devices specifically utilized primarily during wireless power transfer from the power transmitting system. As described in more detail herein, the low load devices may include devices aiding in autonomous or semi-autonomous driving to adjust a driving direction of the vehicle so that misalignment between the vehicle and the power transmitting system may be minimized. Utilizing the magnetic sensors to transmit power to these devices eliminates the need to adjust the power requirements of the power receiving pad and, rather, utilize the magnetic sensors to satisfy the additional power demands.

Figure 1:
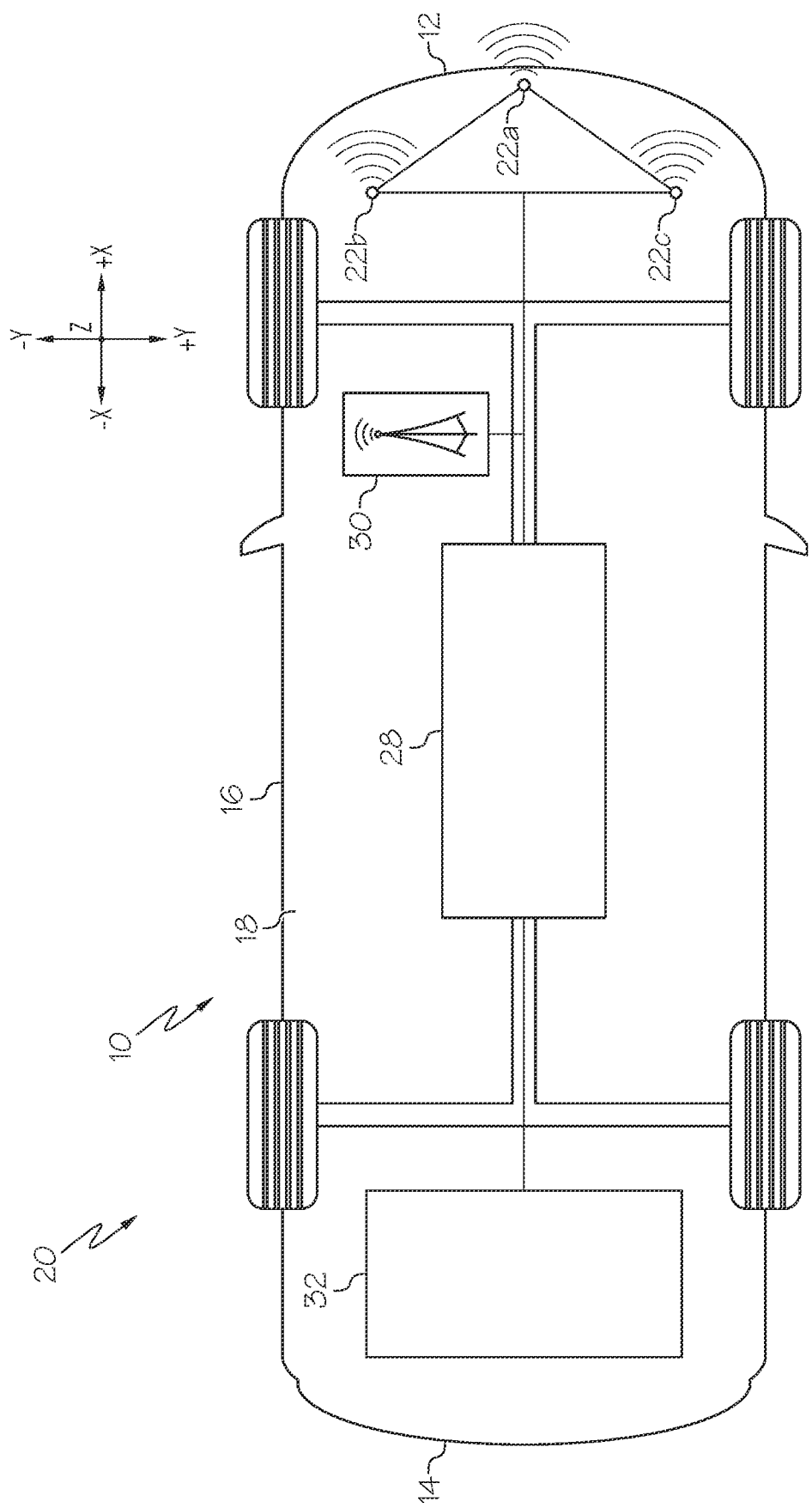
FIG. 1 schematically depicts a bottom view of a vehicle including a power receiving system according to one or more embodiments shown and described herein.

As used herein, the term "vehicle longitudinal direction" refers to the forward-rearward direction of the vehicle (i.e., in the +/−vehicle X direction depicted in FIG. 1). The term "vehicle lateral direction" refers to the cross-vehicle direction (i.e., in the +/−vehicle Y direction depicted in FIG. 1), and is transverse to the longitudinal vehicle direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward," as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Generally, embodiments described herein are directed to power receiving systems of a vehicle that generally include one or more low load devices and a plurality of magnetic sensors operable between a misalignment detection mode for measuring a magnetic field of a power transmitting pad and obtaining magnetic field data, and a power receiving mode for wirelessly transmitting energy from the power transmitting pad to the one or more low load devices. Various embodiments of the systems and the operation of the systems are described in more detail herein. Whenever possible, the same reference numerals will be used throughout the drawings to refer to the same or like parts.

Figure 2:
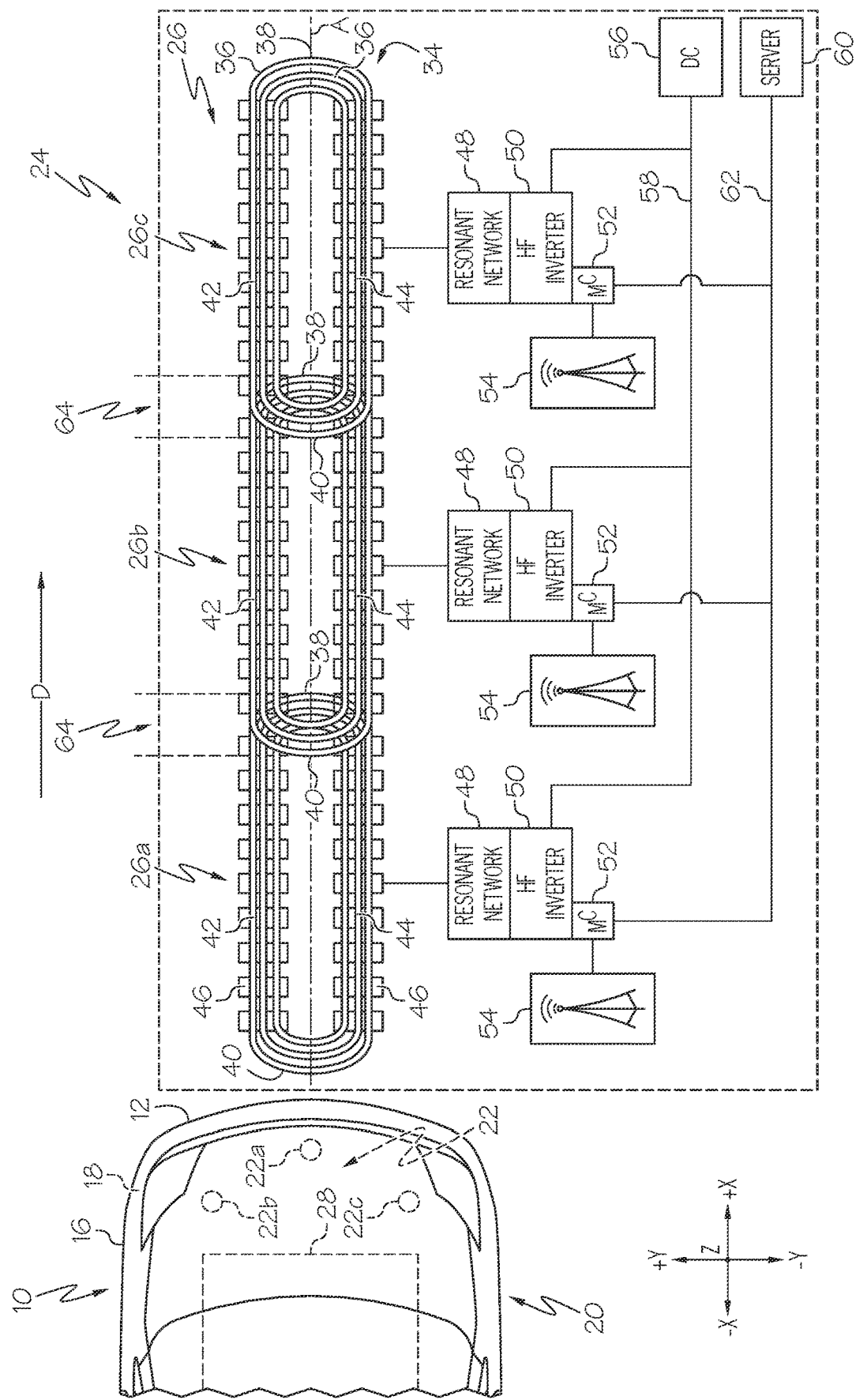
FIG. 2 schematically depicts a power transmitting system and an approaching vehicle according to one or more embodiments shown and described herein.

As shown in FIGS. 1 and 2, a vehicle 10 is shown including a front end 12, a rear end 14, and a vehicle body 16 having a bottom surface 18 extending between the front end 12 and the rear end 14 of the vehicle 10. The vehicle 10 includes a power receiving system 20 including a plurality of magnetic sensors 22 for detecting a magnetic field from a power transmitting assembly on or within a roadway, such as a power transmitting system 24 including a plurality of power transmitting pads 26 illustrated in FIG. 2 and discussed herein, and a power receiving pad 28 for wirelessly receiving power from the power transmitting system 24. The power transmitting pads may be denoted as 26 when referring to the power transmitting pads 26 generally. However, when referring to the power transmitting pads 26 individually, the power transmitting pads 26 may be denoted as a first power transmitting pad 26a, a second power transmitting pad 26b, a third power transmitting pad 26c, and the like, as shown, which are arranged in a driving direction D. While reference herein is made to the power receiving pad 28 wirelessly receiving power from the power transmitting pad 26, it is to be appreciated that the power receiving pad 28 may be capable of receiving power from any known or yet-to-be-developed embodiment of a power transmitting pad, such as an existing in-ground system. In an embodiment, a wireless charging system is provided, which includes both the power receiving system 20 and the power transmitting system 24, as disclosed herein.

The vehicle 10 includes at least two magnetic sensors 22 for detecting a magnetic field and measuring the magnetic flux density of the magnetic field provided by each power transmitting pad 26 of the power transmitting system 24. In some embodiments, as shown, the vehicle 10 includes three magnetic sensors 22. However, more than or fewer than three magnetic sensors 22 may be provided. It should be appreciated that providing additional magnetic sensors 22 on the vehicle 10 results in a more accurate estimation of the location of the power transmitting pad 26 relative to the power receiving pad 28. The magnetic sensors 22 may be any suitable magnetic field sensor devices capable of detecting the presence of a magnetic field and the specific magnitude of the magnetic field. The magnetic sensors 22 may be denoted as 22 when referring to the magnetic sensors 22 generally. However, when referring to the magnetic sensors 22 individually, the magnetic sensors 22 may be denoted as a first magnetic sensor 22a, a second magnetic sensor 22b, and a third magnetic sensor 22c, as shown.

In some embodiments, the magnetic sensors 22 are provided on the bottom surface 18 of the vehicle 10 proximate the front end 12 of the vehicle 10 so that the magnetic sensors 22 encounter the magnetic field of each power transmitting pad 26 before the power receiving pad 28. The magnetic sensors 22 may be equally spaced apart from a longitudinal axis of the vehicle and, thus, aligned with a longitudinal or magnetic axis A of the power transmitting pads 26 when positioned in the center of a lane of a road. However, in instances in which the power transmitting pads 26 are not positioned in the center of a lane, the magnetic sensors 22 may be fixedly or movably repositioned to a location of the vehicle 10 in the vehicle lateral direction along the bottom surface 18 of the vehicle 10 to align the magnetic sensors 22 with the magnetic axis A of the power transmitting pads 26 while maintaining the position of the vehicle 10 within the center of the lane. As shown, the magnetic sensors 22 are located in a triangular configuration with a first magnetic sensor 22a located in a vehicle-forward direction with respect to a second magnetic sensor 22b and a third magnetic sensor 22c. In some embodiments, the magnetic sensors 22 are symmetrically aligned with a central longitudinal axis of the power receiving pad 28.

Positioning the magnetic sensors 22 proximate the front end 12 of the vehicle 10 and spaced apart from the power receiving pad 28 allows the magnetic sensors 22 to estimate misalignment with respect to a forward power transmitting pad 26 while the power receiving pad 28 of the vehicle 10 receives power from at least one rearward power transmitting pad 26. In doing so, data from the magnetic sensors 22 may be utilized in an artificial neural network to estimate whether there is any lateral misalignment between the vehicle 10, specifically the power receiving pad 28, and the power transmitting pad 26 so that the position of the vehicle 10 may be adjusted accordingly as it travels down the road and over subsequent power transmitting pads 26.

As noted herein, the magnetic sensors 22 are configured to detect the magnetic field, which is then used to estimate the lateral misalignment between the power receiving pad 28 and the power transmitting pads 26 with respect to the magnetic axis A of each power transmitting pad 26. As such the magnetic axis A correlates to a central axis extending through each of the power transmitting pads 26. As referred to herein, "lateral misalignment" refers to displacement in a vehicle lateral direction between the power receiving pad 28 and the magnetic axis A of the power transmitting pads 26. It should be appreciated that the rate of energy wirelessly transmitted to the vehicle 10 is greatest when the power receiving pad 28 is directly aligned with, or over, the magnetic axis A of the power transmitting pad 26, i.e., the magnetic field. Misalignment or displacement in the vehicle lateral direction may reduce the rate of energy transferred between the power receiving pad 28 and the power transmitting pad 26.

With respect to the power receiving pad 28, the power receiving pad 28 may be located on the bottom surface 18 of the vehicle body 16 of the vehicle 10. In some embodiments, similar to the magnetic sensors 22, the power receiving pad 28 may be located along the longitudinal axis of the vehicle 10 to align with a center of the power transmitting pad 26 and the magnetic field. However, as noted above, in instances in which the power transmitting pad 26 is not positioned in the center of a lane, the power receiving pad 28 may be fixedly or movably repositioned along the bottom surface 18 of the vehicle 10. The power receiving pad 28 may be any suitable wireless power receiving device, such as an inductive coil, for wirelessly receiving a charge from an inductive power transmitting pad.

As noted herein, the power transmitting pads 26 may be part of an existing in-ground system configured to wirelessly transmit power from the power transmitting pads 26 to the power receiving pad 28, which in turn may be used to recharge a battery 32 of the vehicle 10 or power the vehicle 10 directly by bypassing the battery 32. In some embodiments, as shown in FIG. 2, the power transmitting system 24 is shown, including the plurality of power transmitting pads 26. Each power transmitting pad 26 may be identical in structure and, therefore, reference to one power transmitting pad 26 is applicable to each power transmitting pad 26. The power transmitting pads 26 are arranged to form a power transmitting assembly 34. Each power transmitting pad 26 includes at least one coil 36. Each power transmitting pad 26 includes a forward end 38, a rear end 40, a first side 42, and a second side 44, the sides 42, 44 extending between the forward end 38 and the rear end 40. The forward end 38 refers to a forward driving direction D when a vehicle 10 drives down a lane of a road in which the power transmitting assembly 34 is located. A plurality of connecting members 46 may be provided along the sides 42, 44 of the power transmitting pad 26. As shown, no connecting members 46 are provided at the forward end 38 and the rear end 40 of the power transmitting pad 26.

Further, each power transmitting pad 26 may include a resonant network 48, a high-frequency inverter 50, and a microcontroller 52. In some embodiments, the power transmitting pad 26 further includes a pad communication device 54 electrically connected to the microcontroller 52 for wirelessly communicating with the vehicle communication device 30 to receive instruction from the vehicle 10, and discussed herein. The power transmitting pads 26 are each connected to a power source 56 via a power line 58 for energizing the coil 36, and the microcontroller 52 of each power transmitting pad 26 may be optionally connected to a server 60 via a Control Area Network line 62. In some embodiments, the power transmitting pads 26 may be wirelessly connected to the server 60 via the pad communication device 54, thereby eliminating the need for the Control Area Network line 62. In some embodiments, the power transmitting pads 26 may receive instruction from the vehicle 10 via the server 60 as opposed to the power transmitting pad 26 directly via the pad communication device 54.

In some embodiments, the power transmitting pads 26 are linearly arranged to abut against one another at opposite front and rear ends. However, it should be appreciated that the forward end 38 and the rear end 40 of the power transmitting pads 26 provide less power than the amount of power provided along the sides 42, 44 of the power transmitting pads 26. Therefore, this may result in a discontinuity or decrease in the magnitude of the magnetic field between adjacent power transmitting pads 26. To address this deficiency, in some embodiments, the forward end 38 of at least some of the power transmitting pads 26 may overlap the rear end 40 of an immediately adjacent power transmitting pad 26, forming an overlapping region 64. This ensures that power transfer to the vehicle 10 is uniform and does not have significant variations across the power transmitting assembly 34.

Figure 3:
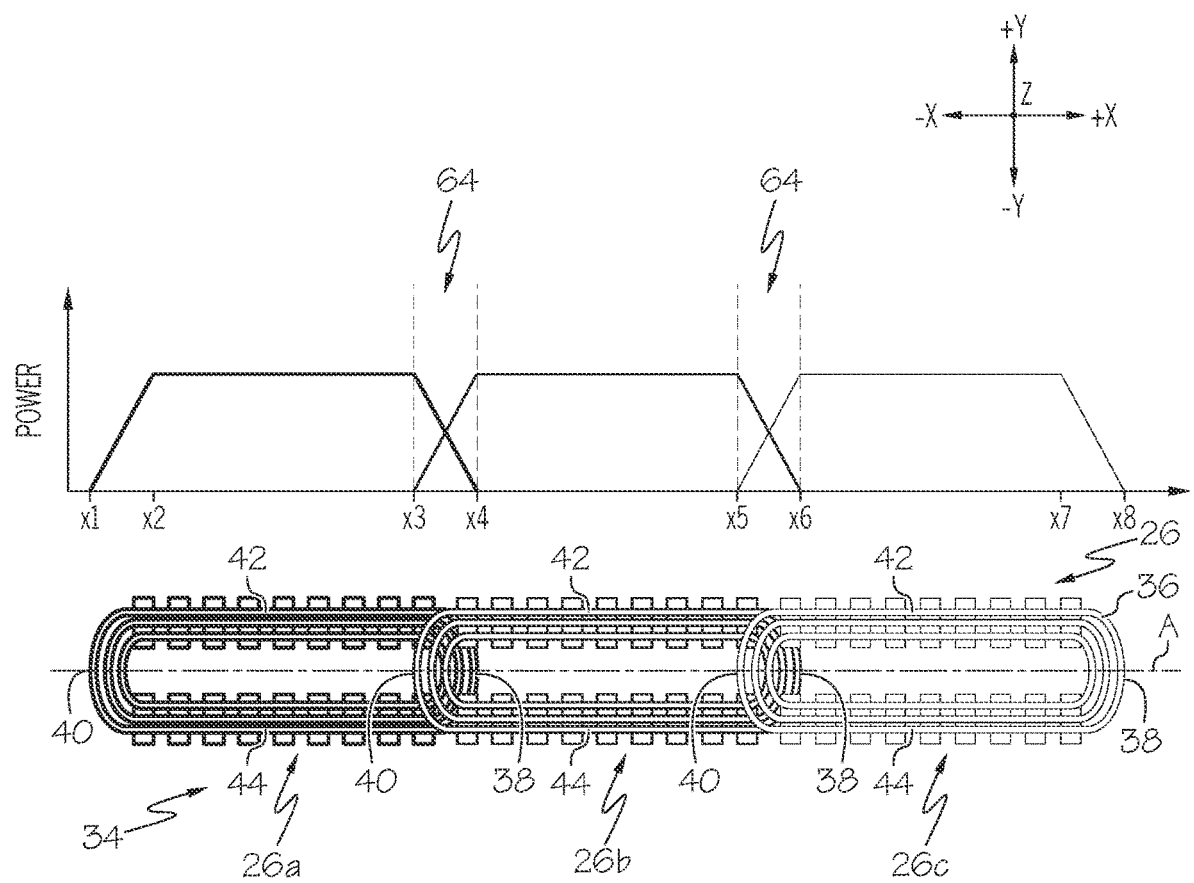
FIG. 3 schematically depicts a chart indicating individual power output of each power transmitting pad of the power transmitting system according to one or more embodiments shown and described herein.

Referring to FIG. 3, a chart indicates the power transmitted from each of the power transmitting pads 26 to the power receiving pad 28 when the vehicle 10 is moving along the length of the power transmitting assembly 34 in the vehicle-forward direction (in the +X-direction). As discussed herein below, the power transmitting pads 26 are configured to switch from a misalignment estimation mode to a power transmitting mode. In addition, the power transmitting pads 26 are configured to coordinate with one another as to when to initiate the misalignment estimation mode and switch to the power transmitting mode. Initially, each power transmitting pad 26 is deactivated. When instructed, the power transmitting pad 26 is activated into the misalignment estimation mode to generate a magnetic field which the magnetic sensors 22 detect. Subsequently, the power transmitting pad 26 switches to the power transmitting mode to transmit power to the power receiving pad 28 as the power receiving pad 28 passes over the power transmitting pad 26.

In some embodiments, the power transmitting pads 26 operate at a frequency between 2 kHz and 6 kHz when in the misalignment estimation mode. In some embodiments, the power transmitting pads 26 operate at a frequency between 4 kHz and 5 kHz when in the misalignment estimation mode. Further, in some embodiments, the power transmitting pads 26 provide a power between 3 amps and 10 amps when in the misalignment estimation mode. In some embodiments, the power transmitting pads 26 provide a power between 4 amps and 7 amps when in the misalignment estimation mode. In some embodiments, the power transmitting pads 26 operate at a frequency between 20 kHz and 100 kHz when in the power transmitting mode. In some embodiments, the power transmitting pads 26 operate at a frequency between 70 kHz and 90 kHz when in the power transmitting mode. Further, in some embodiments, the power transmitting pads 26 provide current between 40 amps and 80 amps when in the power transmitting mode.

In an example embodiment, the first power transmitting pad 26a initially receives a signal from another power transmitting pad 26, the server 60, or the vehicle 10 directly indicating that the vehicle 10 is approaching the first power transmitting pad 26a and instructing the power transmitting pad 26a to switch to the power transmitting mode. At the same time, the second transmitting pad 26b will be initiated to start the misalignment estimation mode to estimate lateral misalignment and/or the vertical offset prior to the power receiving pad 28 of the vehicle 10 passing over the second transmitting pad 26b.

As noted herein, the power of the power transmitting pad 26 is greater at the sides 42, 44 thereof. Thus, as shown, the power output of the first power transmitting pad 26a gradually increases from X1 to X2. At X2, the first power transmitting pad 26a achieves a maximum power output and maintains this power output from X2 to X3. At X3, the power output of the power transmitting pad 26a begins to decrease. At the same time, the second power transmitting pad 26b is instructed to switch from the misalignment estimation mode to the power transmitting mode to begin transmitting power to the power receiving pad 28. Thus, between X3 and X4, which defines the overlapping region 64 between the first power transmitting pad 26a and the second power transmitting pad 26b, the power provided by the first power transmitting pad 26a gradually decreases and the power of the second power transmitting pad 26b gradually increases. The power decrease rate of the first power transmitting pad 26a matches or corresponds to the power increase rate of the second power transmitting pad 26b to provide uniform power at the overlapping region 64 of the first power transmitting pad 26a and the second power transmitting pad 26b.

At X4, the first power transmitting pad 26a turns off in order to conserve power, and the second power transmitting pad 26b maintains a constant power output until X5, at which point the above process repeats with respect to the third power transmitting pad 26c at X6-X8. Although only three power transmitting pads 26 are shown, it should be appreciated that the above steps may be repeated for each power transmitting pad 26 in the power transmitting assembly 34 such that the power transmitting pads 26 are sequentially operated. Power output remains uniform between adjacent power transmitting pads 26.

It is contemplated that any number of power transmitting pads 26 may be employed and each having any suitable geometry, such as including a curve or multiple curves formed in the sides 42, 44 thereof between the rear end 40 and the forward end 38. However, when the power transmitting pad 26 includes a curvature formed therein, each side 42, 44 of the power transmitting pad 26 has an identical curvature to maintain a constant width of the power transmitting pad 26 and, thus, the magnetic field provided.

Figure 4:
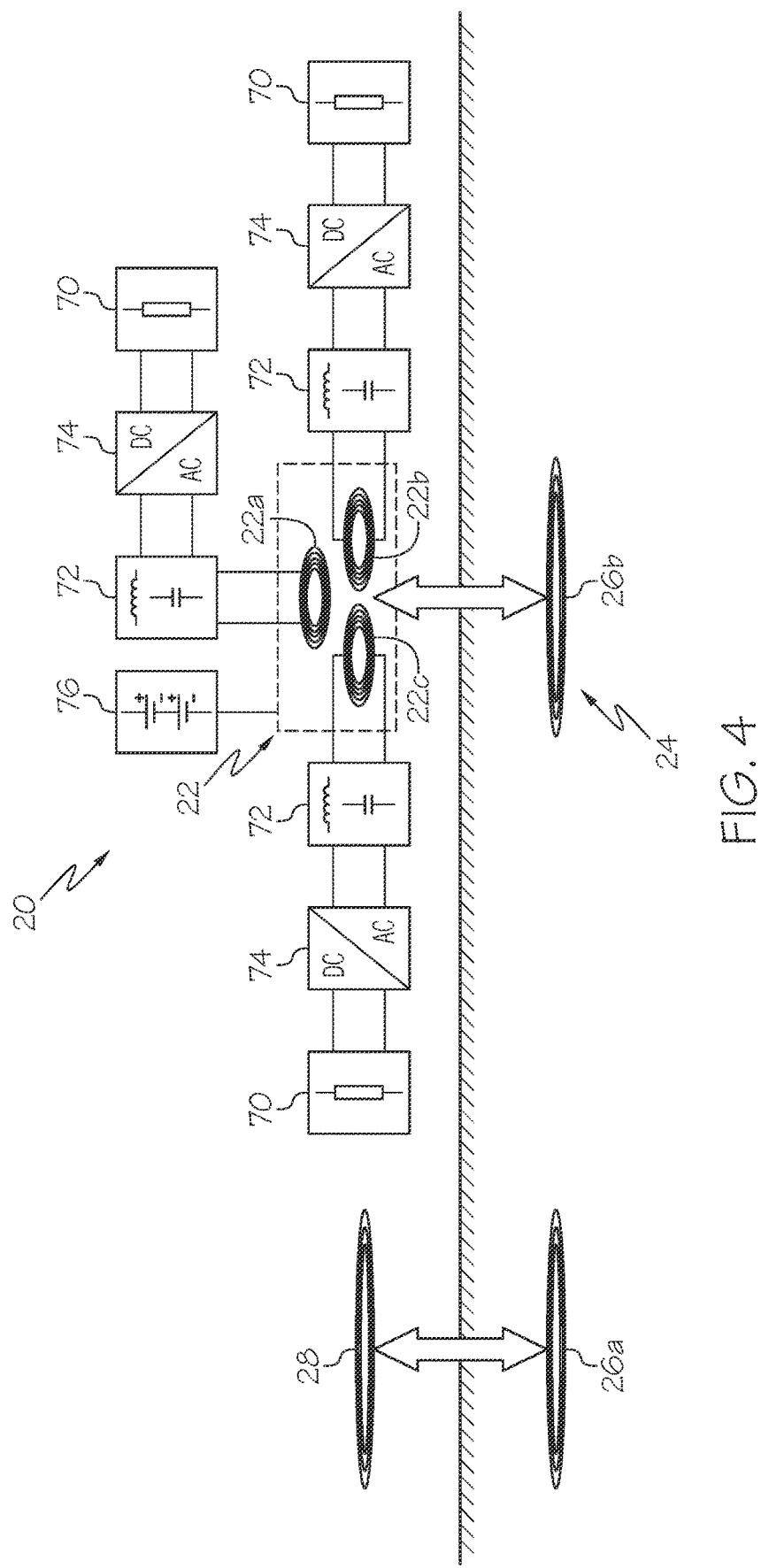
FIG. 4 schematically depicts a circuit diagram of the power receiving system and the power transmitting system.

Referring now to FIG. 4, the magnetic sensors 22a, 22b, 22c of the vehicle 10 are illustrated as being positioned over a forward power transmitting pad, such as power transmitting pad 26b, and the power receiving pad 28 of the vehicle 10 is illustrated as being positioned over a rearward power transmitting pad, such as power transmitting pad 26a. In addition, each of the magnetic sensors 22 are illustrated as being electrically coupled to a low load device 70 via a compensation 72 and a rectifier 74. It should be appreciated that the connection between each magnetic sensor 22 and the corresponding low load device 70 is not limited to the specific arrangement of the compensation 72 and the rectifier 74 as disclosed herein. As such, other components and connections for permitting energy to be transmitted and/or converted from the magnetic sensor 22 to the low load device 70 are contemplated as being within the scope of the present disclosure. In addition, although only a single low load device 70 is illustrated as being coupled to each magnetic sensor 22, it should be appreciated that a plurality of low load devices 70 may be electrically coupled to each magnetic sensor 22.

It should be appreciated that, in embodiments, the magnetic sensors 22 either receive energy from the power transmitting pads 26 to estimate misalignment or, alternatively, transmit energy to the low load devices 70. As such, the magnetic sensors 22 operate between a misalignment detection mode in which the magnetic sensors 22 operate in the manner discussed herein to detect lateral misalignment, or alternatively operate in a power receiving mode in which energy is transmitted to the low load devices 70 from the magnetic sensors 22. Thus, the magnetic sensors 22 alternate between the misalignment detection mode and the power receiving mode when a condition is satisfied, discussed in more detail herein. Specifically, the magnetic sensors 22 may alternate from the misalignment detection mode to the power receiving mode when a first condition is satisfied, and alternate from the power receiving mode back to the misalignment detection mode when a second condition is satisfied.

As used herein, the term "low load device" refers to any device capable of receiving and operating in response to receiving a low power transmission from the power transmitting pad 26 via the magnetic sensors 22. As discussed herein, the magnetic sensors 22 are configured to receive energy having a low frequency and a low power from the power transmitting pads 26. Accordingly, the low load devices 70 are capable of operating in response to receiving energy when the power transmitting pads 26 operate in the misalignment estimation mode, which provides energy having a frequency of between 2 kHz and 6 kHz and a power between 3 amps and 10 amps.

In embodiments, the low load devices 70 are devices for use when the vehicle 10 is operating in an autonomous and/or semi-autonomous driving mode and the vehicle 10 is positioned over the power transmitting pads 26. Non-limiting examples of suitable low load devices 70 include LiDAR, RADAR, GPS devices, cameras, sensors, misalignment monitors/displays/indicators, and the like. Examples of misalignment monitors, displays, or indicators may include a display screen capable of displaying whether the vehicle 10 is currently experiencing a misalignment with the power transmitting pads 26 and what adjustment is needed to reduce the misalignment, whether the magnetic sensors 22 are currently receiving power from the power transmitting pads 26, in what mode the magnetic sensors 22 are currently operating, and the like.

In embodiments, the low load devices 70 do not include a battery for storing power received from the magnetic sensors 22. As such, the low load devices 70 are capable of being operated only when the magnetic sensors 22 are operated in the power receiving mode and positioned above a power transmitting pad 26. Alternatively, in embodiments, the low load devices 70 are electrically coupled to a battery 76. Specifically, each low load device 70 may be electrically coupled to a different corresponding battery or, alternatively, each low load device 70 may be electrically coupled to the same battery 76, as shown. The battery 76 is configured to store energy received from the magnetic sensors 22 such that the low load devices 70 may be utilized at times other than when the magnetic sensors 22 are operated in the power receiving mode and positioned above the power transmitting pads 26 such as, for example, when the magnetic sensors 22 are operated in the misalignment detection mode and/or not positioned above a power transmitting pad 26.

A non-limiting example of a condition that determines whether the magnetic sensors 22 are to be operated in the misalignment detection mode or the power receiving mode is whether the magnetic sensors 22 receive a request to operate one or more of the low load devices 70. The request may be received from user requesting to operate a specific one of the low load devices 70 such as, for example, the misalignment monitor to display a misalignment of the magnetic sensors 22 relative to the power transmitting pads 26. In embodiments, the instruction may be received in response to the position of the vehicle 10 being adjusted such that the magnetic sensors 22 are aligned with a power transmitting pad 26 and power reception by the magnetic sensors 22 is made possible. As such, use of one or more of the low load devices 70 may be desired to detect a misalignment between the magnetic sensors 22 and the power transmitting pads 26, and determine a necessary adjustment in the position of the vehicle 10 to reduce the misalignment.

Another non-limiting example of a condition that determines the mode in which the magnetic sensors 22 will operate is a length of time in which the magnetic sensors 22 have been operating in one of the modes. For example, if the magnetic sensors 22 have been operating in the power receiving mode for a length of time exceeding a threshold time limit, the magnetic sensors 22 may switch to operating, at least temporarily, in the misalignment detection mode. Similarly, the magnetic sensors 22 may switch from the misalignment detection mode to the power receiving mode if the magnetic sensors 22 have been operating in the misalignment detection mode for a length of time exceeding a threshold time limit. In embodiments, the threshold time limits may be the same, such that the magnetic sensors 22 operate in the misalignment detection mode and the power receiving mode for equal times. In other embodiments, the threshold time limits may be different such that the magnetic sensors 22 operate in one mode more often than the other mode. In embodiments, the threshold time limit for operating the magnetic sensors 22 in the power receiving mode is longer than the threshold time limit for operating the magnetic sensors 22 in the misalignment detection mode. This allows the magnetic sensors 22 to primarily transmit energy to the low load devices 70 while receiving power from the power transmitting pads 26, but still periodically detect any misalignment so that the position of the vehicle 10 may be adjusted accordingly. This is particularly useful when the low load devices 70 are not electrically coupled to the battery 76 and can only be operated when the magnetic sensors 22 are positioned over the power transmitting pads 26.

As noted above, the low load devices 70 may be electrically coupled to the battery 76 for storing energy such that the low load devices 70 may be operated at times when the magnetic sensors 22 are not actively receiving power from the power transmitting pads 26. In these embodiments, the magnetic sensors 22 may operate in the power receiving mode until a power level of the battery 76 of one or more of the low load devices 70 exceeds a maximum power level. The maximum power level may denote a power capacity of the battery 76. Thus, once the power level of the battery 76 reaches a maximum power level, the magnetic sensors 22 may be operated in the misalignment estimation mode since the low load devices 70 may not need to actively receive energy. Additionally, in embodiments, the magnetic sensors 22 may be operated in the misalignment detection mode until the power level in the battery 76 of one or more of the low load devices 70 reaches a minimum power level, at which point the magnetic sensors 22 switches back to the power receiving mode to provide energy to the low load devices 70, specifically the battery 76, and increase the power level of the battery 76 above the minimum power level. The minimum power level may denote a power level below which one or more of the low load devices 70 may not be able to be operated.

Figure 5:
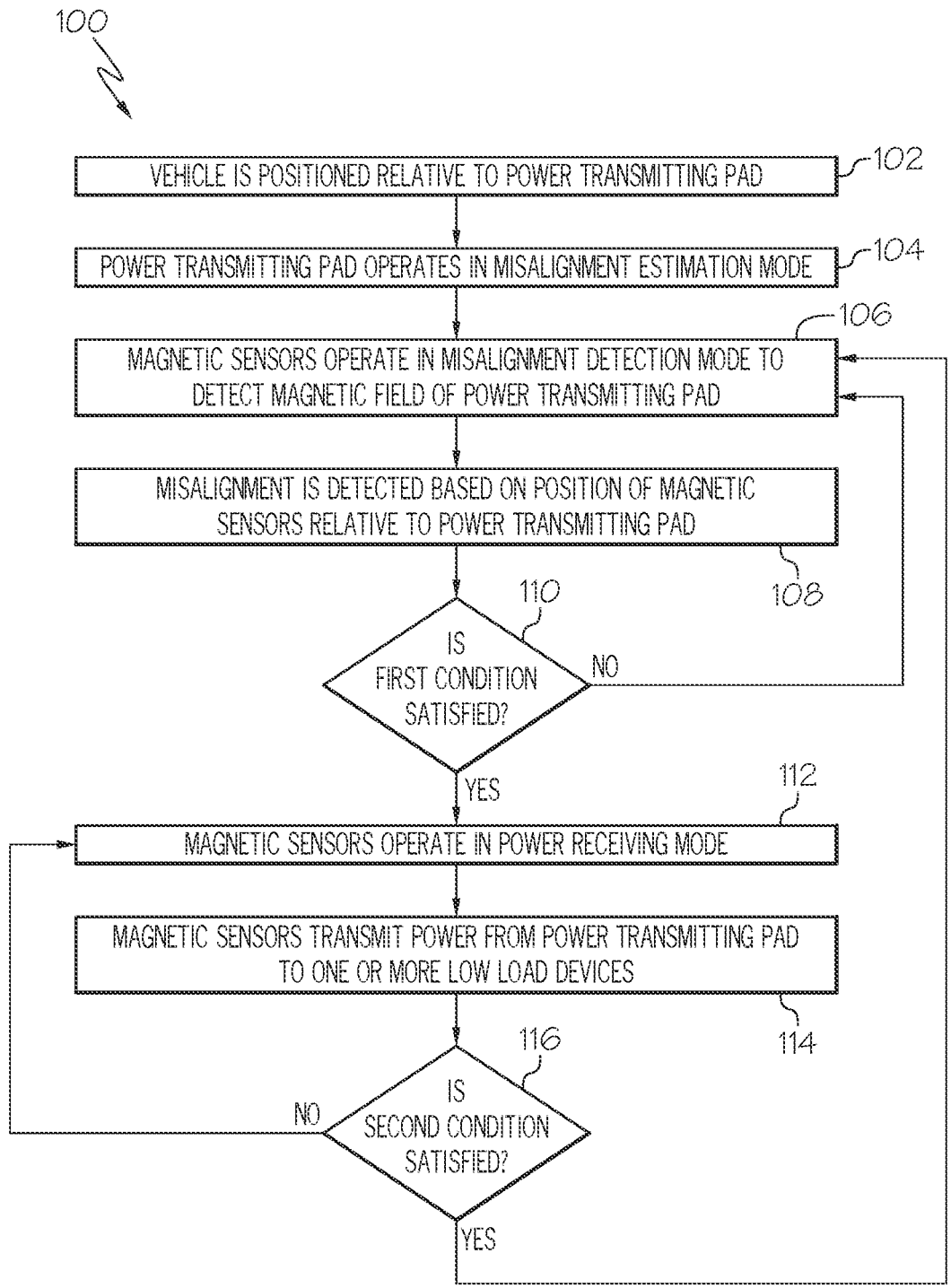
FIG. 5 depicts a flowchart of the operation of the power transmitting system and the power receiving system according to one or more embodiments shown and described herein.

Referring now to FIG. 5, with reference to the systems illustrated in FIGS. 1-4, a method 100 is shown for alternating the magnetic sensors 22 between estimating the lateral misalignment of the vehicle 10 with respect to the power transmitting pad 26, and transmitting energy to the low load devices 70.

At step 102, the vehicle 10, specifically the magnetic sensors 22, are positioned relative to the power transmitting pad 26, such as power transmitting pad 26b as shown in FIG. 4. Although the method disclosed herein discusses a specific example of the vehicle 10 moving in a driving direction D over the power transmitting pads 26 and the power transmitting pads 26 alternating between operating modes based on a relative location of the vehicle 10, it should be appreciated that the present disclosure of estimating lateral misalignment and wirelessly transmitting power from the magnetic sensors 22 to the low load devices 70 is equally applicable to when the vehicle 10 is parked and remains stationary over a single power transmitting pad 26.

At step 104, the power transmitting pad 26 is initially activated to operate in the misalignment estimation mode, for example, by energizing the power transmitting pad 26. Until this point, the power transmitting pad 26 may be deactivated to conserve energy. In some embodiments, the power transmitting pad 26 may be activated by receiving a signal from the server 60, which may be in communication with the vehicle 10, directly or indirectly through one or more network connections.

At step 106, the magnetic sensors 22 are initially operated in the misalignment detection mode to detect the magnetic field of the power transmitting pad 26 above which the magnetic sensors 22 are positioned, which is operated in the misalignment estimation mode. Thus, the magnetic sensors 22 of the vehicle 10 detect the magnetic field of the power transmitting pad 26 to estimate misalignment. The detection of the magnetic field by the magnetic sensors 22 is utilized for estimating lateral misalignment, as discussed in more detail herein.

In instances in which the vehicle 10 is moving across the power transmitting pad 26, the power transmitting pad 26 is instructed to switch to the power transmitting mode to transmit energy from the power transmitting pad 26 to the power receiving pad 28. The energy received by the power receiving pad 28 may be used to recharge the battery 32 of the vehicle 10 or may be used to power electric components of the vehicle 10 directly. It should be appreciated that when the energy is used to power the vehicle 10 directly, the size of the battery 32 may be reduced or eliminated entirely. As such, the magnetic sensors 22 are positioned over another power transmitting pad 26 operating in the misalignment estimation mode.

At step 108, with the magnetic sensors 22 still operating in the misalignment detection mode, a trained artificial neural network of the power receiving system 20 may estimate the lateral misalignment of the vehicle 10 with regard to the power receiving pad 28 and the power transmitting pad 26 based on data received from the magnetic sensors 22 with respect to the magnetic field. Additional information on estimating lateral misalignment between the vehicle 10 and the power transmitting pad 26 utilizing the magnetic sensors 22 can be found in U.S. patent application Ser. No. 16/885,010, filed on May 28, 2020, and entitled "Systems and Methods for Wireless Vehicle Power Transfer and Misalignment Estimation," the entirety of which is hereby incorporated by reference.

As discussed herein, the magnetic sensors 22 are switched between the misalignment detection mode and the power receiving mode in response to a first condition or a second condition being satisfied. At step 110, when the magnetic sensors 22 are operating in the misalignment detection mode, it is determined whether a first condition is satisfied.

A non-limiting example of the first condition being satisfied at step 110 is if a request is received to operate the low load device 70. The request may be received in response to an action performed by a user requesting operation or use of a specific one of the low load devices 70. Alternatively, the request may be received automatically in response to the position of the vehicle 10 being adjusted such that the magnetic sensors 22 are aligned with a power transmitting pad 26.

Another non-limiting example of the first condition being satisfied at step 110 is if the time in which the magnetic sensors 22 have been operating in the misalignment detection mode exceeds a threshold time limit. The length of time in which the magnetic sensors 22 have been operating in the misalignment detection mode is determined at step 110 and when the length of time exceeds the threshold time limit, the first condition is satisfied.

Another non-limiting example of the first condition being satisfied at step 110 is if a power level of a battery electrically coupled to the magnetic sensors 22 falls below a minimum power level. As such, the magnetic sensors 22 may operate in the misalignment detection mode until a power level of the battery 76 of one or more of the low load devices 70 falls below the minimum power level.

If it is determined that the first condition is satisfied at step 110 based on any of the examples discussed herein, the magnetic sensors 22 are switched at step 112 to operate in the power receiving mode. It should be appreciated that the examples discussed above do not form an exhaustive list of ways in which the first condition may be satisfied. Alternatively, if the first condition is not satisfied at step 110, the method 100 returns to step 106 and the magnetic sensors 22 remain in the misalignment detection mode.

In response to the first condition being satisfied at step 110, the magnetic sensors 22 switch from the misalignment detection mode to the power receiving mode at step 112. At step 114, the magnetic sensors 22 receive energy from the power transmitting pad 26 above which the magnetic sensors 22 are positioned and directs this received energy to the low load devices 70. The magnetic sensors 22 remain in the power receiving mode to direct energy to the load devices 70 until a second condition is satisfied. At step 116, when the magnetic sensors 22 are operating in the power receiving mode, it is determined whether the second condition is satisfied.

A non-limiting example of the second condition being satisfied at step 116 is if the time in which the magnetic sensors 22 have been operating in the power receiving mode exceeds a threshold time limit. The length of time in which the magnetic sensors 22 have been operating in the power receiving mode is determined at step 116 and when the length of time exceeds the threshold time limit, the second condition is satisfied. As discussed herein, the threshold time limit for operating the magnetic sensors 22 in the misalignment detection mode and the threshold time limit for operating the magnetic sensors 22 in the power receiving mode may be the same. In other embodiments, the threshold time limits may be different.

Another non-limiting example of the second condition being satisfied at step 116 is if a power level of a battery electrically coupled to the magnetic sensors 22 exceeds a maximum power level. As such, the magnetic sensors 22 may operate in the power receiving mode until a power level of the battery 76 of one or more of the low load devices 70 exceeds the maximum power level.

It should be appreciated that the examples discussed above do not form an exhaustive list of ways in which the second condition may be satisfied. In response to the second condition being satisfied at step 116, the method 100 returns to step 106 such that the magnetic sensors 22 are switched back to the misalignment estimation mode. Alternatively, if it is determined at step 116 that the second condition is not satisfied, the method 100 returns to step 112 and the magnetic sensors 22 continue to operate in the power receiving mode.

Figure 6:
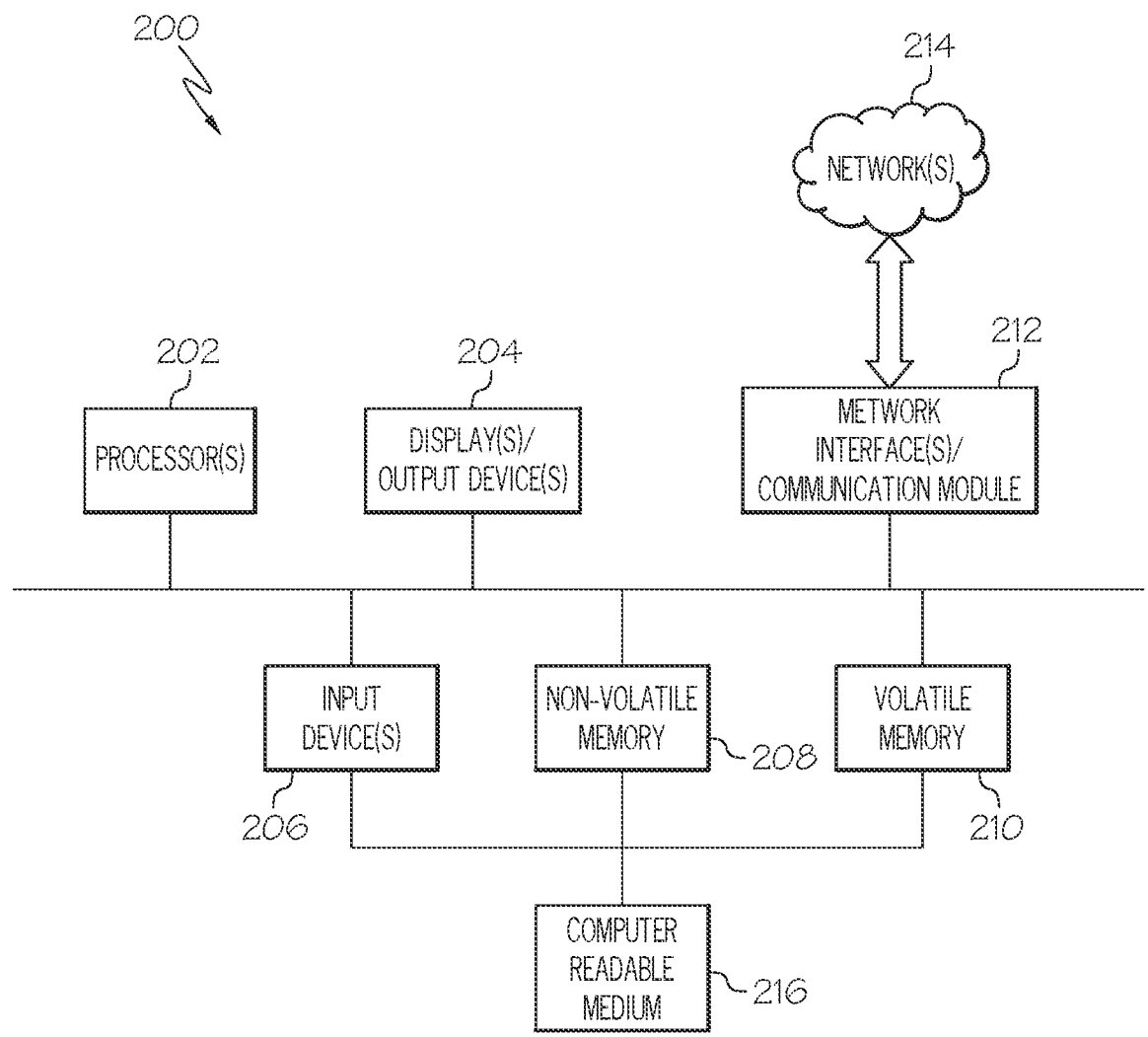
FIG. 6 depicts a block diagram illustrating computing hardware utilized in one or more devices for implementing various systems and processes according to one or more embodiments shown and described herein.

Turning to FIG. 6, a block diagram illustrates an exemplary computing environment 200 through which embodiments of the disclosure can be implemented, such as, for example, the magnetic sensors 22 and/or any subcomponents therein, along with any other computing device depicted in any of FIGS. 1-4. The exemplary computing environment 200 may include non-volatile memory 208 (ROM, flash memory, etc.), volatile memory 210 (RAM, etc.), or a combination thereof. In some embodiments, the at least one processor 202 is coupled to non-transitory memory such as the non-volatile memory 208 and/or volatile memory 210. The exemplary computing environment 200 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The exemplary computing environment 200 can include one or more displays and/or output devices 204, such as monitors, speakers, headphones, projectors, wearable-displays, and/or holographic displays, for example. As discussed hereinabove, the driver of the vehicle 10 may receive the notification indicating the lateral misalignment of the vehicle 10 with respect to the power transmitting pads 26 via the display and/or output devices 204. The exemplary computing environment 200 may further include one or more input devices 206 which can include, by way of example, any type of mouse, keyboard, disk/media drive, memory stick/thumb drive, memory card, pen, joystick, gamepad, touch-input device, biometric scanner, voice/auditory input device, motion-detector, camera, scale, etc.

A network interface 212, which may include the vehicle communication device 30, can facilitate communications over one or more networks 214 via wires, via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near-field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The exemplary computing environment 200 may include one or more network interfaces 212 to facilitate communication with one or more remote devices, which may include, for example, client and/or server devices, such as the server in communication with the power transmitting system 24. A network interface 212 may also be described as a communications module, as these terms may be used interchangeably. Network interface 212 can be communicatively coupled to any device capable of transmitting and/or receiving data via the one or more networks 214, which may correspond to any computing device depicted in any of FIGS. 1-4, by way of non-limiting example.

The network interface 212 can include a communication transceiver for sending and/or receiving any wired or wireless communication. For example, the network interface 212 may include an antenna, a modem, LAN port, Wi-Fi card, WiMax card, mobile communications hardware, near-field communication hardware, satellite communication hardware, and/or any wired or wireless hardware for communicating with other networks and/or devices.

A computer-readable medium 216 may comprise a plurality of computer-readable mediums, each of which may be either a computer-readable storage medium or a computer-readable signal medium. A computer-readable medium 216 may reside, for example, within an input device 206, non-volatile memory 208, volatile memory 210, or any combination thereof. A computer-readable storage medium can include tangible media that is able to store instructions associated with, or used by, a device or system. A computer-readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer-readable storage medium may also include, for example, a system or device that is of a magnetic, optical, semiconductor, or electronic type. Computer-readable storage media exclude propagated signals and carrier waves.

From the above, it is to be appreciated that defined herein is a vehicle including a plurality of magnetic sensors operable between a misalignment detection mode and a power receiving mode. When the magnetic sensors are in the misalignment detection mode, the magnetic sensors are configured to detect a magnetic field of a power transmitting pad to estimate lateral misalignment between the vehicle and the power transmitting pad. Alternatively, when the magnetic sensors are in the power receiving mode, the magnetic sensors receive power from the power transmitting pad and transmit the power to electrically coupled low load devices.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   one or more low load devices;
   a plurality of magnetic sensors operable between a misalignment detection mode for measuring a magnetic field of a power transmitting pad and obtaining magnetic field data, and a power receiving mode for wirelessly transmitting energy from the power transmitting pad to the one or more low load devices;
   one or more processors; and
   one or more memory modules comprising a non-transitory computer-readable medium storing computer-readable instructions that, when executed by the one or more processors, cause the one or more processors to:
      receive the magnetic field data from the plurality of magnetic sensors;
      estimate a lateral misalignment of the plurality of magnetic sensors with respect to a magnetic axis of the power transmitting pad; and
      cause the plurality of magnetic sensors to switch from the misalignment detection mode and operate in the power receiving mode in response to receiving a request to operate one or more of the plurality of low load devices.

2. The vehicle of claim 1, wherein the vehicle includes at least three magnetic sensors located proximate a front end of the vehicle.

3. The vehicle of claim 1, wherein the vehicle includes a plurality of low load devices, each of the plurality of low load devices electrically coupled to one of the plurality of magnetic sensors.

4. The vehicle of claim 3, wherein the plurality of low load devices comprises a camera, LiDAR sensor, or an ECU.

5. The vehicle of claim 1, wherein the computer-readable instructions, when executed by the one or more processors, cause the plurality of magnetic sensors to switch from the misalignment detection mode and operate in the power receiving mode in response to the plurality of magnetic sensors operating in the misalignment detection mode for a length of time exceeding a threshold time limit.

6. The vehicle of claim 1, wherein the computer-readable instructions, when executed by the one or more processors, cause the plurality of magnetic sensors to operate in the misalignment detection mode in response to a determination that a power level of the one or more low load devices exceeds a maximum power level.

7. The vehicle of claim 1, wherein the computer-readable instructions, when executed by the one or more processors, cause the plurality of magnetic sensors to operate in the power receiving mode in response to a power level of the one or more low load devices falling below a minimum power level.

8. A vehicle comprising:
one or more low load devices;
a power receiving pad for wirelessly receiving energy from a power transmitting pad;
a plurality of magnetic sensors operable between a misalignment detection mode for measuring a magnetic field of the power transmitting pad and obtaining magnetic field data, and a power receiving mode for wirelessly transmitting energy from the power transmitting pad to the one or more low load devices;
one or more processors; and
one or more memory modules comprising a non-transitory computer-readable medium storing computer-readable instructions that, when executed by the one or more processors, cause the one or more processors to:
 receive the magnetic field data from the plurality of magnetic sensors;
 estimate a lateral misalignment of the power receiving pad with respect to a magnetic axis of the power transmitting pad; and
 cause the plurality of magnetic sensors to switch from misalignment detection mode and operate in the power receiving mode in response to the plurality of magnetic sensors operating in the misalignment detection mode for a length of time exceeding a threshold time limit.

9. The vehicle of claim 8, wherein the vehicle includes at least three magnetic sensors located proximate a front end of the vehicle.

10. The vehicle of claim 8, wherein the vehicle includes a plurality of low load devices, each of the plurality of low load devices electrically coupled to one of the plurality of magnetic sensors.

11. The vehicle of claim 10, wherein the plurality of low load devices comprises a camera, LiDAR sensor, or an ECU.

12. The vehicle of claim 8, wherein the computer-readable instructions, when executed by the one or more processors, cause the plurality of magnetic sensors to operate in the power receiving mode in response to receiving a request to operate one or more of the plurality of low load devices.

13. The vehicle of claim 8, wherein the computer-readable instructions, when executed by the one or more processors, cause the plurality of magnetic sensors to switch from the misalignment detection mode and operate in the power receiving mode in response to the plurality of magnetic sensors operating in the misalignment detection mode for a length of time exceeding a threshold time limit.

14. The vehicle of claim 8, wherein the computer-readable instructions, when executed by the one or more processors, cause the plurality of magnetic sensors to operate in the misalignment detection mode in response to a determination that a power level of the one or more low load devices exceeds a maximum power level.

15. The vehicle of claim 8, wherein the computer-readable instructions, when executed by the one or more processors, cause the plurality of magnetic sensors to operate in the power receiving mode in response to a power level of the one or more low load devices falling below a minimum power level.

16. A method for providing dynamic wireless power transfer to one or more low load devices of a vehicle, the method comprising:
operating a plurality of magnetic sensors in a misalignment detection mode;
detecting, using the plurality of magnetic sensors, a magnetic field provided by a power transmitting pad to obtain magnetic field data;
estimating a lateral misalignment of a power receiving pad with respect to a magnetic axis of the power transmitting pad using the magnetic field; and
switching the plurality of magnetic sensors from the misalignment detection mode to operate in a power receiving mode in response to receiving a request to operate one or more of the plurality of low load device to wirelessly transmit power to one or more low load devices from the power transmitting pad.

17. The vehicle of claim 16, further comprising:
determining a length of time in which the plurality of magnetic sensors have operated in the misalignment detection mode; and
switching the plurality of magnetic sensors from the misalignment detection mode to the power receiving mode in response to determining that the length of time exceeds a threshold time limit.

18. The vehicle of claim 16, further comprising:
determining a power level of the one or more low load devices; and
switching the plurality of magnetic sensors from the power receiving mode to the misalignment detection mode in response to determining that the power level of the one or more low load devices exceeds a maximum power level.

19. The vehicle of claim 16, further comprising:
determining a power level of the one or more low load devices; and
switching the plurality of magnetic sensors from the misalignment detection mode to the power receiving mode in response to determining that the power level of the one or more low load devices is below a minimum power level.

* * * * *

UNITED STATES PATENT AND TRADEMARK OFFICE
CERTIFICATE OF CORRECTION

PATENT NO. : 11,482,892 B2
APPLICATION NO. : 17/167825
DATED : October 25, 2022
INVENTOR(S) : Chungchih Chou and Yanghe Liu It is certified that error appears in the above-identified patent and that said Letters Patent is hereby corrected as shown below:

In the Drawings

In drawing sheet(s) 6 of 6, figure 6, block 212, delete "Metwork" and insert --Network--, therefor.

In the Specification

In Column 1, Line(s) 8, before "U.S. Provisional", insert --co-pending--.

Signed and Sealed this
Twentieth Day of December, 2022

*Katherine Kelly Vidal*

Katherine Kelly Vidal
*Director of the United States Patent and Trademark Office*